United States Patent [19]

Ushiyama et al.

[11] Patent Number: 5,054,120
[45] Date of Patent: Oct. 1, 1991

[54] RECEIVER FOR PERSONAL RADIO PAGING SERVICE

[75] Inventors: Katsumi Ushiyama; Sadafumi Sakamoto, both of Hamura; Seiji Nishikawa, Tokyo, all of Japan

[73] Assignees: Kokusai Electric Co., Ltd.; Nippon Telegraph & Telephone Corporation, both of Tokyo, Japan

[21] Appl. No.: 651,045

[22] Filed: Feb. 4, 1991

Related U.S. Application Data

[63] Continuation of Ser. No. 325,200, Mar. 17, 1989, abandoned.

[30] Foreign Application Priority Data

Mar. 24, 1988 [JP] Japan .................................. 63-68206

[51] Int. Cl.⁵ .............................................. H04B 1/08
[52] U.S. Cl. .................................... 455/351; 455/228; 455/280; 343/718
[58] Field of Search .................... 455/90, 97, 349, 351, 455/269, 129, 344, 280, 228; 343/702, 718, 741; 361/422, 424; 340/925.44

[56] References Cited

U.S. PATENT DOCUMENTS

| | | | |
|---|---|---|---|
| 3,736,591 | 5/1973 | Rennecs et al. | 343/702 |
| 4,814,776 | 3/1989 | Caci et al. | 343/702 |
| 4,894,663 | 1/1990 | Urbish et al. | 343/702 |

Primary Examiner—Reinhard Eisenzopf
Assistant Examiner—Edward Urban
Attorney, Agent, or Firm—Emmanuel J. Lobato; Robert E. Burns

[57] ABSTRACT

A personal radio paging service receiver is housed in a thin, card-shaped housing. The housing houses the circuitry of the receiver and is formed by fixedly sandwiching a frame made as an insulator between two parallel rectangular panels of equal size made of conductive material. Conductive fasteners are provided which electrically connect the separate panels at opposed sides thereof. A conductive fastener electrically connects one of the panels at one end and a conductive member provides an input path to a receiving input circuit of the receiver so that the housing serves as a radio frequency receiving antenna.

4 Claims, 3 Drawing Sheets

RECEIVER FOR PERSONAL RADIO PAGING SERVICE

This is a continuation, of application Ser. No. 07/325,200, filed Mar. 17, 1989, now abandoned.

BACKGROUND OF THE INVENTION

The present invention relates to a housing of a receiver for personal radio paging service in the VHF band and its receiving antenna structure.

Various types of receiving antennas are employed for miniature radio receivers in view of the frequency bands used and the uses and shapes of the receivers. For use in the HF band and the lower frequency bands the receiving antenna usually takes the form of a wire hanging from the receiver, an earphone cord or a form in which a coil is wound around a rod of ferrite. For use in the VHF, UHF and quasi-microwave bands a U-shaped antenna formed by bending a rectangular plate twice 90° each has been employed conventionally as a loop antenna as disclosed in U.S. Pat. No. 3,436,591 and U.S. Pat. No. 4,814,776. In further miniaturizing the receiver for personal radio paging service in the VHF band into a card form for use as a microminiature receiver which does not use the earphone but has a calling buzzer or an information display such as a liquid crystal display, it is difficult, due to dimensional restrictions, to incorporate the antenna into the receiver housing. Moreover, the U-shaped loop antenna is suitable for use in the frequency bands above 400 MHz and in the state in which it is not significantly affected by the surrounding conditions and held at a certain distance from the human body; however, in case of applying such a loop antenna to a microminiature receiver for personal radio paging service which is used in the VHF band and is usually carried in the user's pocket, bag or handbag, an increase in the quality factor of the antenna, intended for increasing its effective gain despite of its miniaturization, will make the antenna susceptible to the influence of the surrounding conditions, in particular, the influence of the human body, and if the quality factor is reduced so as to lessen the influence, the receiving sensitivity will become so low as not to be practicable. In other words, the conventional loop antenna constitutes a serious obstacle to the microminiaturization of the receiver. Accordingly, the miniaturization of the antenna is the most important problem yet to be solved in the implementation of a thin card-shaped microminiature receiver for personal radio paging service although microminiature electronic circuits such as an LSI and a battery are readily available.

SUMMARY OF THE INVENTION

An object of the present invention is to provide a thin, card-shaped microminiature receiver for personal radio paging service which solves the problem of the dimensional restriction through utilization of a part of the receiver housing as an antenna without decreasing its effective gain and which has a stable receiving sensitivity substantially insusceptible to the influence of the human body.

To attain the above object of the present invention, there is provided a receiver for personal radio paging service which is housed in a thin, card-shaped housing, is characterized in that the housing with circuits of the receiver incorporated therein is formed by fixedly sandwiching a frame of insulator between rectangular top and bottom panels made of conductor; at least one conductor is provided which electrically connects between the top and bottom panels at one or more places near each side thereof; and another side opposite to the said one side on the bottom panel are electrically connected at one end to a receiving input circuit of the receiver so that the housing serves as a receiving antenna.

BRIEF DESCRIPTION OF THE DRAWINGS

The present invention will be described in detail below with reference to the accompanying drawings, in which.

DETAILED DESCRIPTION

Figure 1:
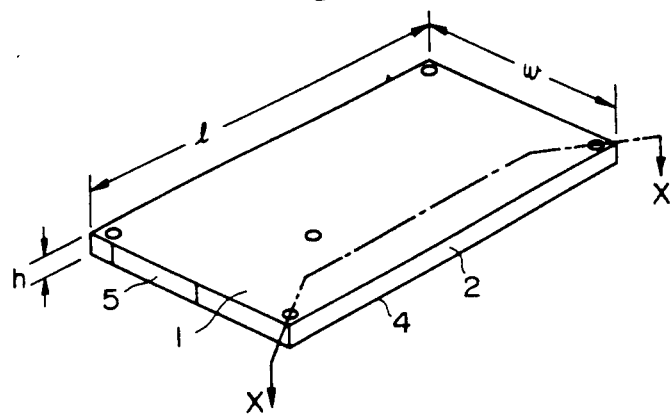
FIG. 1 is a perspective view showing the external appearance of the microminiature receiver for personal radio paging service according to the present invention.
Figure 2:
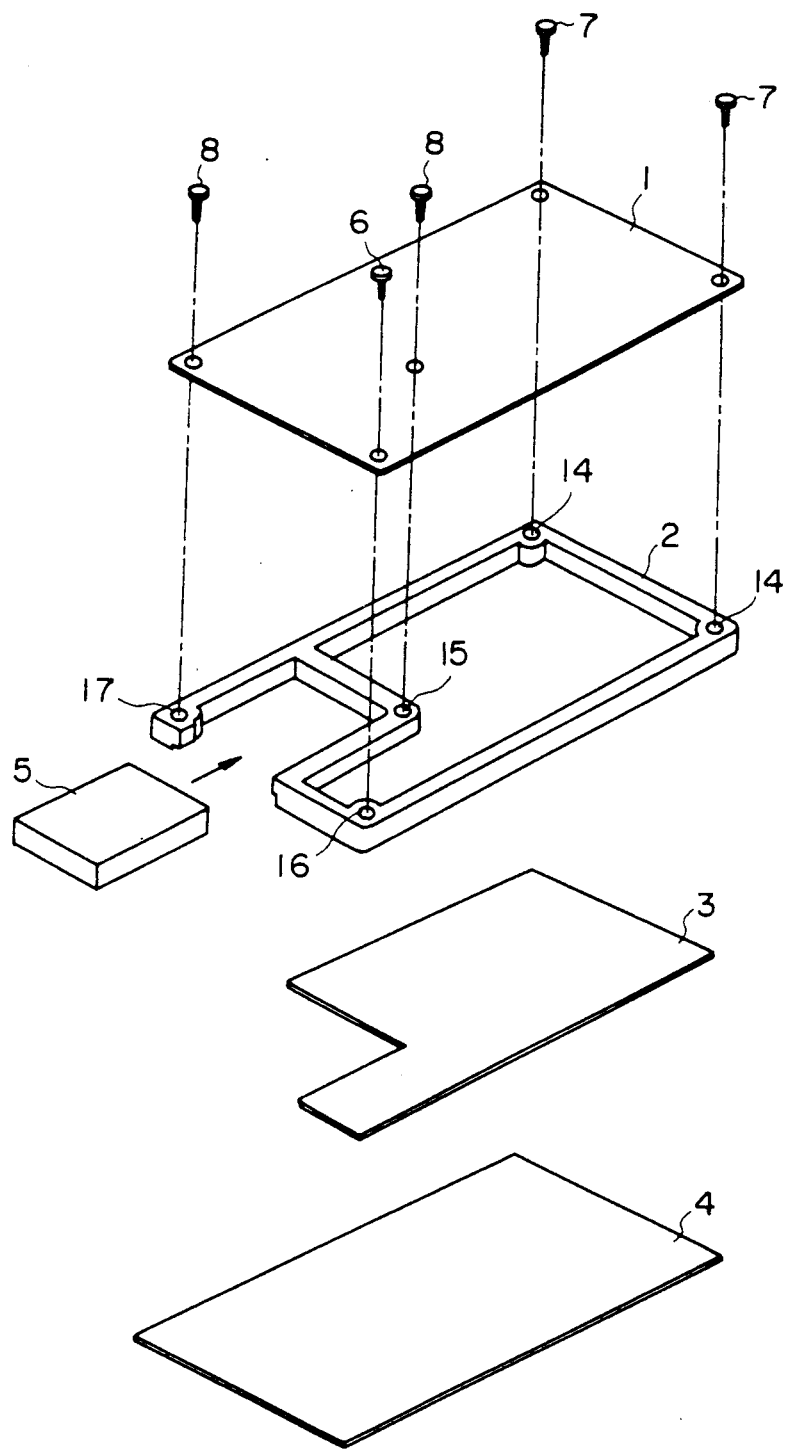
FIG. 2 is a perspective view showing the constructions and arrangement of principal parts of the receiver depicted in FIG. 1.

In FIGS. 1 and 2, reference numerals 1 and 4 indicate rectangular top and bottom panels made of conductor such as a steel sheet, 2 a frame produced by molding of an insulator such as resin, 3 a printed board having packaged thereon electronic circuits and functional circuit parts (not shown) of the receiver, and 5 a miniature battery for operating the receiver circuit, the battery being inserted in the direction indicated by an arrow.

In FIG. 2, reference numerals 6 to 8 designate metal screws for fixing the top panel 1 to the frame 2. These screws are loosely passed through holes made in the top panel 1 in alignment with holes 14 to 17 tapped in the frame 2 at its corner portions and are tightened and fixed to the tapped holes. In order to keep their mechanical strength, the tapped holes 14 to 17 of the frame 2 may also be provided by embedding tapped cylindrical metal members in resin at the time of molding the frame 2.

The printed board 3 with electronic circuits packaged thereon has such a shape as to fit in the frame 2 and is pressed against the bottom panel 4 by a pressure sensitive adhesive double coated insulating sheet or the like. The bottom panel 4 is bonded at its margin to the frame 2.

Figure 3:
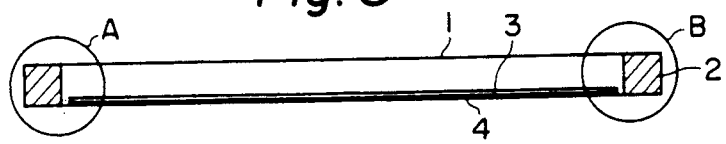
FIG. 3 is a sectional view taken on the line X—X in FIG. 1.
Figure 4:
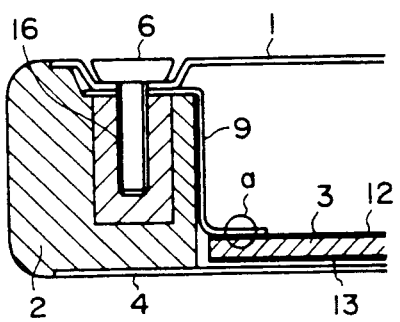
FIG. 4 is an enlarged sectional view showing in detail an example of the construction of the part A in FIG. 3.
Figure 5:
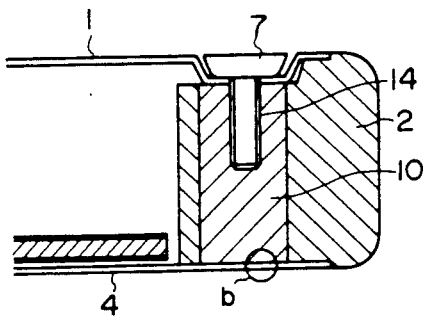
FIG. 5 is an enlarged sectional view showing in detail an example of the construction of the part B in FIG. 3.

FIG. 3 is a sectional view taken on the line X—X in FIG. 1; FIG. 4 an enlarged sectional view showing in detail the part A in FIG. 3; FIG. 5 an enlarged sectional view showing in detail the part B in FIG. 3; and FIGS. 6 and 7 sectional views showing examples of modified forms of the part depicted in FIG. 5.

In FIG. 4, reference numeral 9 denotes a metal member for electrically connecting the top panel 1 to an input terminal portion of an antenna feeding circuit of a top surface conductor 12 of the printed board 3 when the screw 6 is tightened to the tapped hole 16 of the frame 2. The metal member 9 has a through hole through which the screw 6 passes. The top panel 1 and the metal member 9 are made conductive to each other simply by tightening the screw 6 to the frame 2 through their holes. The lower end portion a of the metal member 9 is electrically connected, by soldering or the like, to the input terminal portion of the antenna feeding circuit of the top surface conductor 12 of the printed board 3. Reference numeral 13 identifies a part of a back surface conductor of the printed board 3.

Referring next to FIG. 5, the screw 7 is passed through the hole of the top panel 1 and threadedly engaged with a tapped hole 14 of a metal conductor 10 embedded in the frame 2, by which the top panel 1 and the metal conductor 10 are made conductive to each other. The metal conductor 10 is embedded in the frame 2 but extends therethrough vertically and is held electrically conductive at its bottom to the bottom panel 4 by bonding with a conductive adhesive as indicated by b. As shown in FIG. 2, the two screws 7 are similarly screwed into the frame 2.

Figure 6:
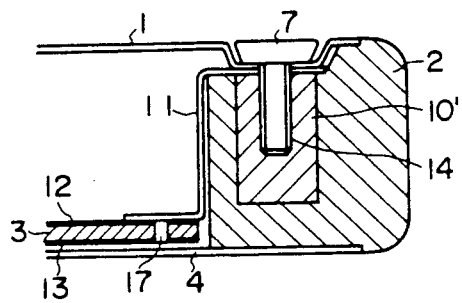

FIG. 6 shows a modification in which a metal conductor 10' having the tapped hole 14 is embedded in the frame 2 for fixing the screw 7 and a metal member 11 is provided for electrically connecting the top and bottom panels 1 and 4. The top panel 1 and the metal member 11 are electrically connected by tightening the screw 7 to the tapped hole 14 through a hole made in the upper portion of the metal member 11 and the hole of the top panel 1. The lower portion of the metal member 11 is connected, as by soldering, to the top surface conductor 12 of the printed board 3 and the top surface conductor 12 is connected through the through hole plating 17 to the back surface conductor 13, which is connected to the bottom panel 4.

Figure 7:
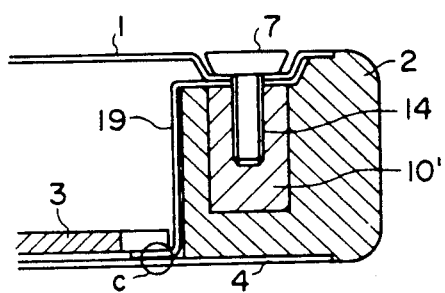
FIGS. 6 and 7 are sectional views showing examples of modifications of the part depicted in FIG. 5.

FIG. 7 shows another modification in which the upper portion of a metal member 19 is the same as that in FIG. 6 but the metal member 19 and the bottom panel 4 are directly coupled together as by soldering at a part c. Needless to say, the printed board 3 has a configuration in which it does not overlap the part c in this case.

Figure 8:
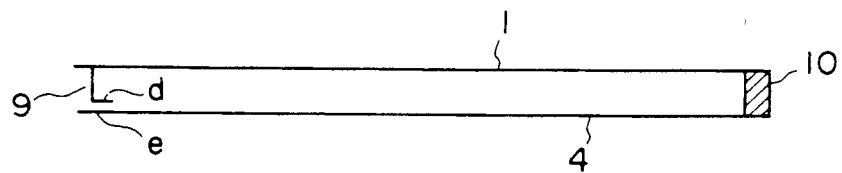
FIG. 8 is a sectional view taken on the line X—X in FIG. 1 schematically showing an example of the construction of a conductor portion.
Figure 9:
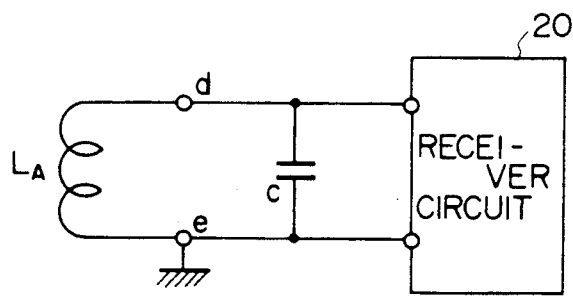
FIG. 9 is a circuit diagram showing the connection of an equivalent circuit and a receiver circuit in the example of FIG. 8.

FIG. 8 shows only the conductor portion of the above-described receiver housing, taken on the line X—X in FIG. 1, and FIG. 9 is a block diagram showing an equivalent antenna circuit and a receiver circuit. In FIG. 8, the top and bottom panels 1 and 4 are short-circuited by the metal conductor 10 at two places near their right-hand ends, and it is seen that the conductor portion, as viewed from the lower end d of the metal member 9 connected to the left-hand end of the top panel 1 and the left-hand end e of the bottom panel 4, forms a loop antenna.

While in the above embodiments the top and bottom panels 1 and 4 are short-circuited to each other at two places, they may also be short-circuited at one or three to five places.

In FIG. 9, $L_A$ is an equivalent circuit of the loop antenna, which is connected at points d and e to a receiver circuit 20. The bottom panel 4 is grounded and a capacitor, is connected across the terminal d and e to form a tuning circuit together with the loop antenna $L_A$ for the frequency of a received wave, by which a received signal can be supplied as an antenna input to the receiver circuit 20.

The top and bottom panels 1 and 4, which are used to form the loop antenna, are made of thin steel sheet, for example, about 0.3 mm thick stainless steel sheet, which is plated with silver or gold so as to reduce the high frequency resistance. The plated top and bottom panels are further painted or coated with ornamental sheets to improve the appearance of the receiver. The bottom panel 4 is connected to the grounded side of the receiver circuit 20 at one or more points which are found optimum by experiments.

It is well-known that the absolute gain $G_a$ of a miniature loop antenna is usually expressed by the following equation:

$$G_a = \eta \frac{3}{2} \sin^2\theta$$

In the above, $\eta$ represents a radiation efficiency, which is expressed by a radiation resistance $R_r$ and a loss resistance $R_l$ as follows:

Radiation efficiency:

$$\eta = \frac{R_r}{R_r + R_l}$$

Radiation resistance:

$$R_r = \frac{320 \, \pi^4 S^2}{\lambda^4}$$

Loss resistance:

$$R_l = \frac{1}{(\pi d)\delta\sigma}$$

where:

$$\delta = \frac{1}{\sqrt{\pi f \mu \sigma}}$$

In the above, S is the area of the loop, L is the circumferential length of the loop, ($\pi d$) is the surface area of an ordinary wire-like loop conductor per unit length, and $\delta$, $\mu$ and $\sigma$ are the skin depth, magnetic permeability and conductivity of the conductor, respectively.

According to the present invention, as shown in FIG. 1, $S = l \times h$, $L = 2(l+h)$, $(\pi d) = 2(w+t)$, where t is the thicknesses of the top and bottom panels 1 and 4. That is, in the case of a thin, card-shaped receiver, since the thickness h of the receiver is small, the loop area S cannot be made large, but since the surface areas of the top and bottom panels 1 and 4, which serve as the loop conductor, can be made large, the width w is large and the loss resistance $R_l$ is small; so that the radiation efficiency $\eta$ is improved, and hence the absolute gain can be increased. In a measured example of a VHF thin receiver about 4 mm thick, about 50 mm wide and about 80 mm long, the absolute gain of the antenna according to the present invention was equal to the gain obtained in a case where the conventional plate-like loop antenna was applied to a thick, box-shaped receiver in which the loop area S could be made sufficiently large.

In addition, the antenna of the present invention has a loop conductor of a large area formed by the top and bottom panels of its outer housing, and hence has a low operation impedance. This lessens the influence of the surrounding conditions, in particular, the influence of the human body, and the antenna sensitivity did not decrease when the receiver was carried in the user's pocket.

As described above in detail, the structure of the present invention which utilizes a part of the receiver housing as the receiving antenna permits the implementation of a microminiature thin, card-shaped VHF receiver for personal radio paging service, which is highly economical because no independent antenna element is needed. Further, the top and bottom panels of the receiver housing which are utilized as the loop antenna are made of metal conductors, and hence produce electrostatic and electromagnetic shielding effects. The receiver of the present invention is mechanically robust against external force or stress and is not readily deformed or distorted not it is readily broken when dropped or subjected to a shock. Consequently, the receiver of the present invention is of great utility when employed as a portable receiver.

What we claim is:

1. A personal radio paging service card-shaped microminiature receiver having a think card-shaped housing for housing therein radio receiver circuitry including a tuning circuit and defining an antenna within which said circuitry is enclosed, the housing comprising an insulative frame defining a space within which said circuitry is enclosed and a pair of separate thin, flat, conductive, panels disposed overlaying opposite sides of the frame within major sides thereof in opposed relationship sandwiching the frame therebetween and secured thereto enclosing said space within which said circuitry is enclosed, a conductive fastener fixing one of the conductive panels on the frame on the one side thereof, a conductive member disposed between said frame and said one panel secured by said conductive fastener in electrical contact with said one panel and extending into said space defining a conductive input from said one panel connected to said circuitry for radio frequency inputs received from said one panel, and another conductive fastener fixing said one panel on the same frame at another side thereof, and another conductive member fixed by said another fastener for defining a conductive path between the conductive panels so that said housing functions as a radiofrequency receiving antenna connected 2. A personal radio paging service card-shaped microminiature receiver according to claim 1, in which said card-shaped panels are rectangular and of the same size.

3. A personal radio paging service card-shaped microminiature receiver according to claim 1, in which said circuitry comprises a radio frequency input circuit connected to the first-mentioned conductive member and having a capacitor connected defining said tuning circuit with said conductive panels for effectively tuning the antenna.

4. A personal radio paging service card-shaped microminiature receiver according to claim 1, in which the second mentioned conductive member effectively electrically connecting the panels connects them at corners thereof.

* * * * *

UNITED STATES PATENT AND TRADEMARK OFFICE
CERTIFICATE OF CORRECTION

PATENT NO. : 5,054,120

DATED : October 1, 1991

INVENTOR(S) : USHIYAMA et al

It is certified that error appears in the above-identified patent and that said Letters Patent is hereby corrected as shown below:

Column 5, lines 20 to 31 and column 6, lines 1 to 13, correct claim 1 to read as follows:

1. A personal radio paging service card-shaped microminiature receiver having a thin card-shaped housing for housing therein radio receiver circuitry including a tuning circuit and defining an antenna within which said circuitry is enclosed, the housing comprising an insulative frame defining a space within which said circuitry is enclosed and a pair of separate thin, flat, conductive panels disposed overlaying opposite sides of the frame within major sides thereof in opposed relationship sandwiching the frame therebetween and secured thereto enclosing said space within which said circuitry is enclosed, a conductive fastener fixing one of the conductive panels on the frame on the one side thereof, a conductive member disposed between said frame and said one panel secured by said conductive fastener in electrical contact with said one panel and extending into said space defining a conductive input from said one panel connected to said circuitry for radio frequency inputs received from said one panel, and another conductive fastener fixing said one panel on the same frame at another side thereof, and another conductive member fixed by said another fastener for defining a conductive path between the conductive panels so that said housing functions as a radiofrequency receiving antenna connected to said tuning circuit of said radio receiver circuitry.

Signed and Sealed this

Twelfth Day of January, 1993

Attest:

DOUGLAS B. COMER

Attesting Officer

Acting Commissioner of Patents and Trademarks